(12) United States Patent
Oomura

(10) Patent No.: US 7,551,304 B2
(45) Date of Patent: Jun. 23, 2009

(54) INFORMATION PROCESSING APPARATUS, IMAGE FORMING APPARATUS, METHOD THEREFOR, AND SYSTEM

(75) Inventor: Hiroshi Oomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 891 days.

(21) Appl. No.: 11/076,316

(22) Filed: Mar. 9, 2005

(65) Prior Publication Data

US 2005/0200889 A1 Sep. 15, 2005

(30) Foreign Application Priority Data

Mar. 10, 2004 (JP) ............................. 2004-067443

(51) Int. Cl.
  *G06F 3/12* (2006.01)
  *G06K 15/00* (2006.01)
  *G06K 9/48* (2006.01)
  *G06F 3/00* (2006.01)

(52) U.S. Cl. .................... 358/1.15; 358/1.13; 358/1.16; 358/1.17; 382/200; 719/327

(58) Field of Classification Search .................. None
See application file for complete search history.

(56) References Cited

U.S. PATENT DOCUMENTS

| 6,557,033 | B2 | 4/2003 | Maeda | |
|---|---|---|---|---|
| 2001/0038461 | A1* | 11/2001 | Murakami et al. | 358/1.13 |
| 2002/0156947 | A1* | 10/2002 | Nishio | 710/36 |
| 2004/0061885 | A1* | 4/2004 | Ikeno | 358/1.11 |

FOREIGN PATENT DOCUMENTS

| JP | 11-161444 A | 6/1999 |
|---|---|---|
| JP | 2002-229751 A | 8/2002 |

* cited by examiner

*Primary Examiner*—Mark K Zimmerman
*Assistant Examiner*—Mesfin Getaneh
(74) *Attorney, Agent, or Firm*—Canon U.S.A. Inc., IP Division

(57) ABSTRACT

An image forming method that is capable of interpreting a plurality of image forming processes includes a setting step of setting an image forming process that is activated by the image forming method, and an issuing step of issuing a manufacturer identifier and machine-type identifier and process identification information representing the image forming process set in the setting step.

7 Claims, 15 Drawing Sheets

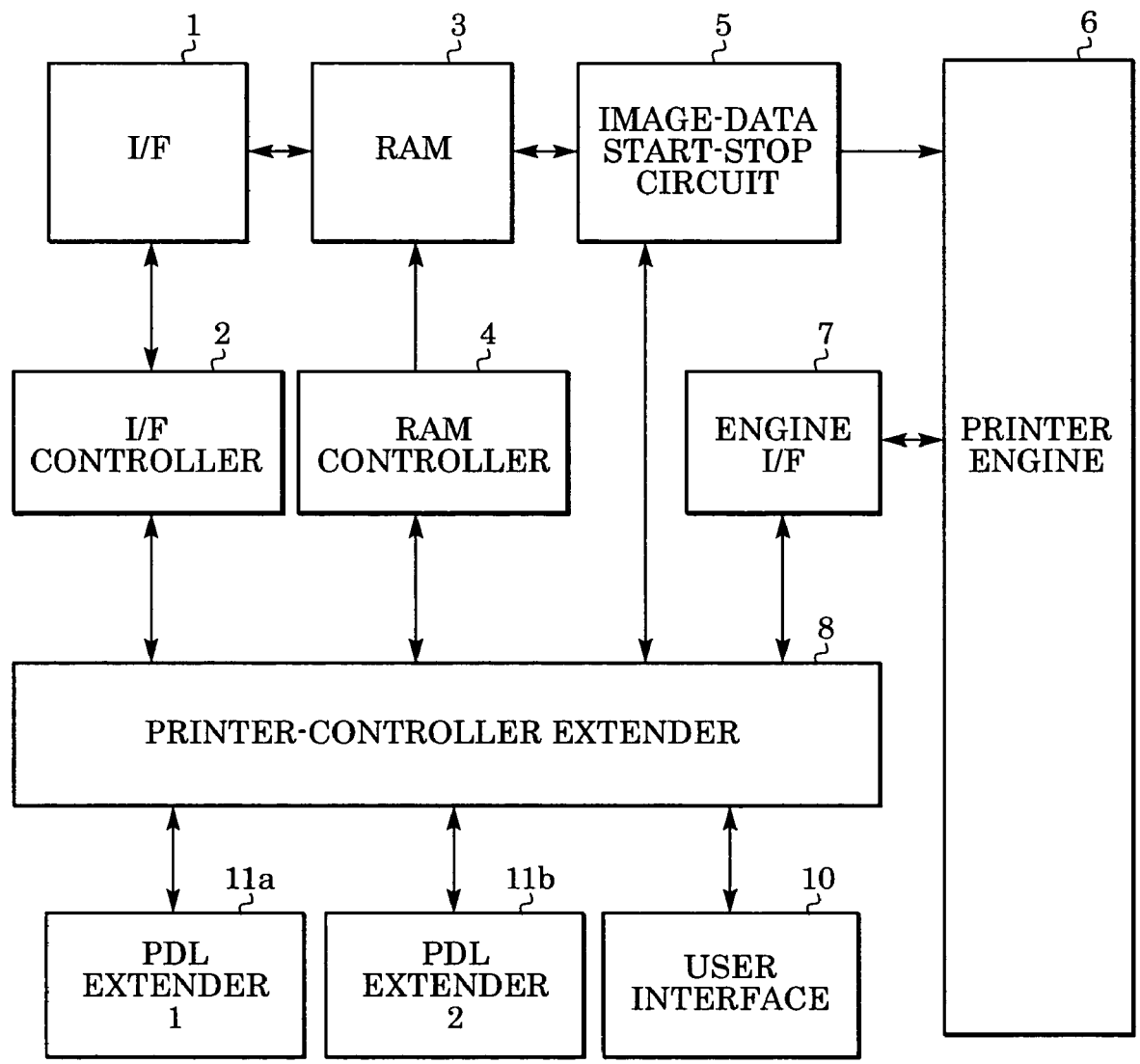

| IEEE-1284 DEVICE INFORMATION<br>CLASS: Printer<br>MFC: ABC<br>MDL: LBP-XXXPDL1<br>CMD: PDL1, IEEE1284 | |
|---|---|
| RECOMMENDABILITY | 2.000 |
| PDL NAME | PDL1 |

~11

| IEEE-1284 DEVICE INFORMATION<br>CLASS: Printer<br>MFC: ABC<br>MDL: LBP-XXXPDL2<br>CMD: PDL2, IEEE1284 | |
|---|---|
| RECOMMENDABILITY | 1.000 |
| PDL NAME | PDL2 |

~11

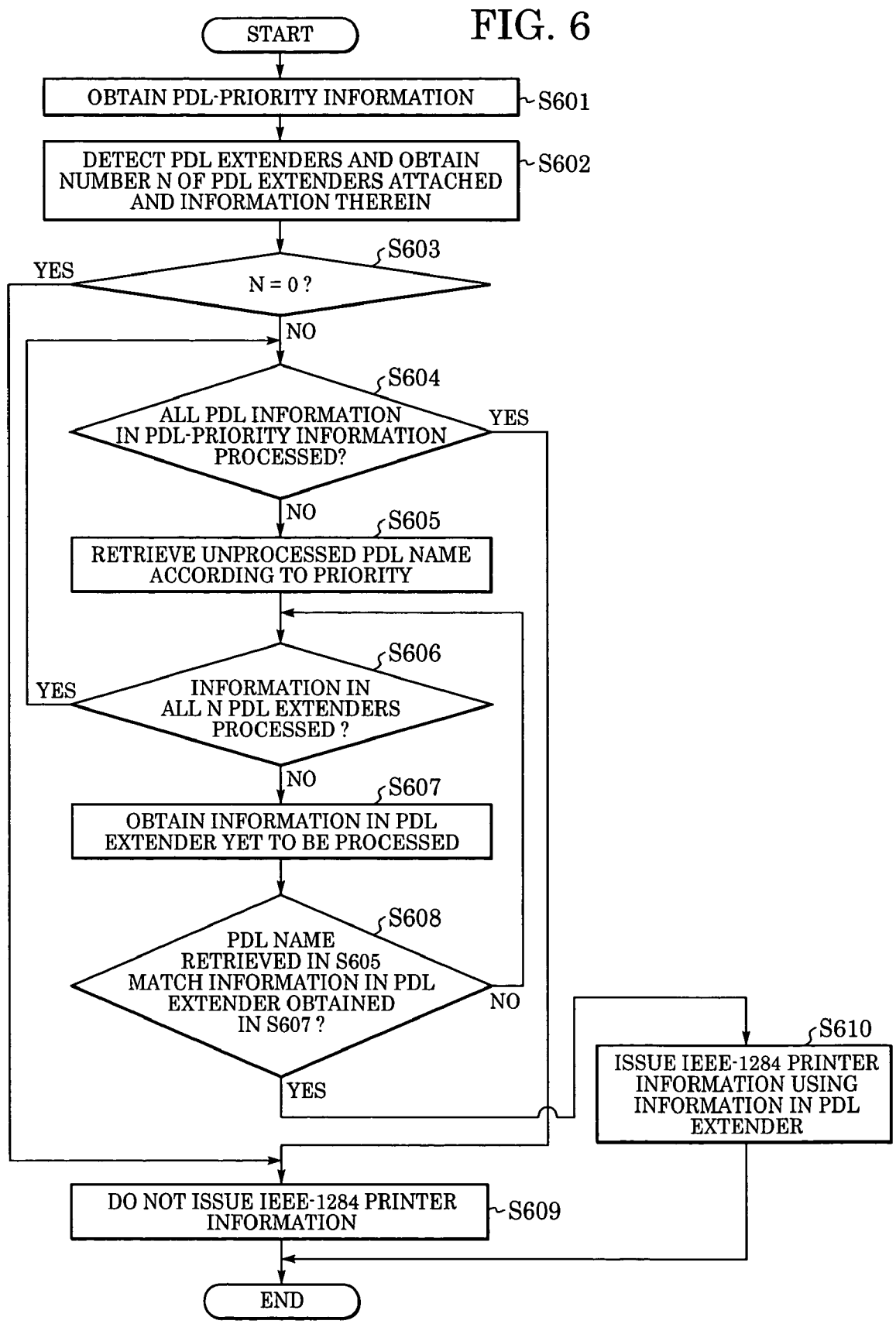

FIG. 10

SELECTION OF PDL FOR PLUG AND PLAY

| ✓ | PDL NAME |
|---|---|
| ✓ | PDL5 |
| ☐ | PDL1 |
| ☐ | PDL2 |

1/1

CANCEL             OK

FIG. 16

| TAG | VALUE |
|---|---|
| CLASS: | Printer |
| MFC | ABD |
| MDL | LBP-XXX |
| CMD | PDL1, IEEE1284 |

INFORMATION PROCESSING APPARATUS, IMAGE FORMING APPARATUS, METHOD THEREFOR, AND SYSTEM

BACKGROUND OF THE INVENTION

1. Field of the Invention

The present invention relates to a peripheral device, an information processing apparatus having mounted thereon a device driver that controls the peripheral device, and a system or the like including the peripheral device and the information processing apparatus.

2. Description of the Related Art

Machines that allow a plurality of extenders, such as page description language (PDL) extenders, to be connected to a print processing apparatus are increasing. Furthermore, in the case of a print processing apparatus that allows switching of a supported drawing system by mounting a corresponding extension board, for example, it is possible to support two drawing language systems PDL1 and PDL2 by the print processing apparatus.

Furthermore, with techniques of plug and play or the like, in response to connection of a peripheral device and an information processing apparatus, such as a host computer, the device sends a device ID, such as a machine type or manufacturer name, to the information processing apparatus, and the information processing apparatus selects and installs a device driver with reference to the device ID. In ordinary plug and play, of data for identifying a print processing apparatus, passed from the print processing apparatus to an information processing apparatus, information representing a drawing language system is disregarded, and a printer driver associated with the print processing apparatus is searched for from the information processing apparatus based on a device ID that is a manufacturer name and/or a name of the print processing apparatus.

According to the techniques described above, when an extension board is attached or detached, the type of PDL that can be processed by the same print processing apparatus could change. Furthermore, although a printer driver must be installed on a host computer in accordance with the type of PDL that can be interpreted by the print processing apparatus, plug-and-play techniques that have been used have had the following problems.

When a plurality of image forming processes can be executed by an image forming apparatus, it has not been possible to select and install a suitable device driver on an information processing apparatus.

For example, when a print processing apparatus supports PDL1 and PDL2 by connecting an extender, although a plurality of printer drivers associated with PDL1 and PDL2 are supported by the print processing apparatus according to the specifications thereof, whether PDL1 or PDL2 is used actually depends on the extender actually connected. Thus, in plug-and-play techniques that have been used, it has not been possible to uniquely identify the type of printer driver needed at a host simply by sending a machine type or manufacturer name to the host.

Another suitable example of print processing apparatus is a laser beam printer, which is used in embodiments described later. Other examples include various peripheral devices and image forming apparatuses, such as ink-jet printers, facsimile machines, laser beam printers, digital cameras, scanners, and combinations thereof.

For example, when a printer driver of the type PDL is found first by plug and play, even when a user needs a printer driver for PDL1, only the printer driver for PDL2 is installed to an OS for a print processing apparatus.

In such a case, when only an extension board for PDL1 is connected to the print processing apparatus, the extension board cannot interpret commands in PDL2. Since only the printer driver for PDL2 is installed on the host computer, when the user simply instructs printing, PDL data corresponding to PDL2 is sent to the print processing apparatus, possibly causing print error.

Even when print error does not occur, in the case of a print processing apparatus that is capable of supporting a plurality of drawing systems, a printer driver that is arbitrarily determined by an installer is installed, which involves PDL data conversion that is not recommended by the developer. This inhibits use of a printer driver for an efficient drawing system recommended by the developer.

SUMMARY OF THE INVENTION

According to an aspect of the present invention, an image forming system is provided. The image forming system includes an image forming apparatus that is capable of executing a plurality of types of processes; and an information processing apparatus that drives the image forming apparatus using a device driver, the information processing apparatus being connected to the image forming apparatus via a predetermined communication medium. The image forming apparatus comprises a transfer controlling unit for controlling a transferring process of reading a machine-type identifier and a manufacturer identifier and process identification information identifying at least one of the plurality of types of processes that can be executed by the image forming apparatus from the image forming apparatus and transferring the machine-type identifier and the manufacturer identifier and the process identification information to the communication medium. The information processing apparatus includes an obtaining unit for obtaining the machine-type identifier and the manufacturer identifier and the process identification information transferred from the communication medium by the transferring process controlled by the transfer controlling unit; and a selecting unit for selecting a device driver that is capable of controlling at least one of the plurality of types of process that can be executed by the image forming apparatus, using the machine-type identifier and the manufacturer identifier and the process identification information obtained by the obtaining unit.

According to another aspect of the present invention, an image forming apparatus that allows interpretation of a plurality of image forming processes is provided. The image forming apparatus includes a setting unit for setting an image forming process that is activated by the image forming apparatus; and an issuing unit for issuing a manufacturer identifier and a machine-type identifier, and process identification information representing the image forming process set by the setting unit.

According to another aspect of the present invention, an image forming method that allows interpretation of a plurality of image forming processes is provided. The image forming method includes a setting step of setting an image forming process that is activated by the image forming method; and an issuing step of issuing a manufacturer identifier and a machine-type identifier, and process identification information representing the image forming process set in the setting step.

According to another aspect of the present invention, an information processing apparatus that is capable of communicating with an image forming apparatus via a predetermined communication medium is provided. The information processing apparatus includes an obtaining unit for obtaining process identification information, and manufacturer identification information or machine-type identification information of the image forming apparatus, transferred from the image forming apparatus; and a selecting unit for selecting a device driver that is capable of controlling at least one of a plurality of processes that can be executed by the image forming apparatus, using the process identification information and the manufacturer identification information or machine-type identification information obtained by the obtaining unit.

According to another aspect of the present invention, an information processing method that allows communication with an image forming apparatus via a predetermined communication medium is provided. The information processing method includes an obtaining step of obtaining process identification information, and manufacturer identification information or machine-type identification information of the image forming apparatus, transferred from the image forming apparatus; and a selecting step of selecting a device driver that is capable of controlling at least one of a plurality of processes that can be executed by the image forming apparatus, using the process identification information and the manufacturer identification information or machine-type identification information obtained in the obtaining step.

According to another aspect of the present invention, a control program including a program that allows an information processing apparatus to execute a method that allows communication with an image forming apparatus via a predetermined communication medium is provided. The method includes an obtaining step of obtaining process identification information, and manufacturer identification information or machine-type identification information of the image forming apparatus, transferred from the image forming apparatus; and a selecting step of selecting a device driver that is capable of controlling at least one of a plurality of processes that can be executed by the image forming apparatus, using the process identification information and the manufacturer identification information or machine-type identification information obtained in the obtaining step.

Further features and advantages of the present invention will become apparent from the following description of exemplary embodiments with reference to the attached drawings.

BRIEF DESCRIPTION OF THE DRAWINGS

FIG. 3 is a block diagram showing the construction of a print processing apparatus according to another embodiment of the present invention.

FIG. 6 is a flowchart of a process of issuing device information according to PDL priority.

FIG. 10 is a diagram showing an example user interface for selecting a PDL for plug and play.

FIG. 16 is a diagram showing an example of IEEE-1284 device information.

DESCRIPTION OF THE EMBODIMENTS

Figure 1:
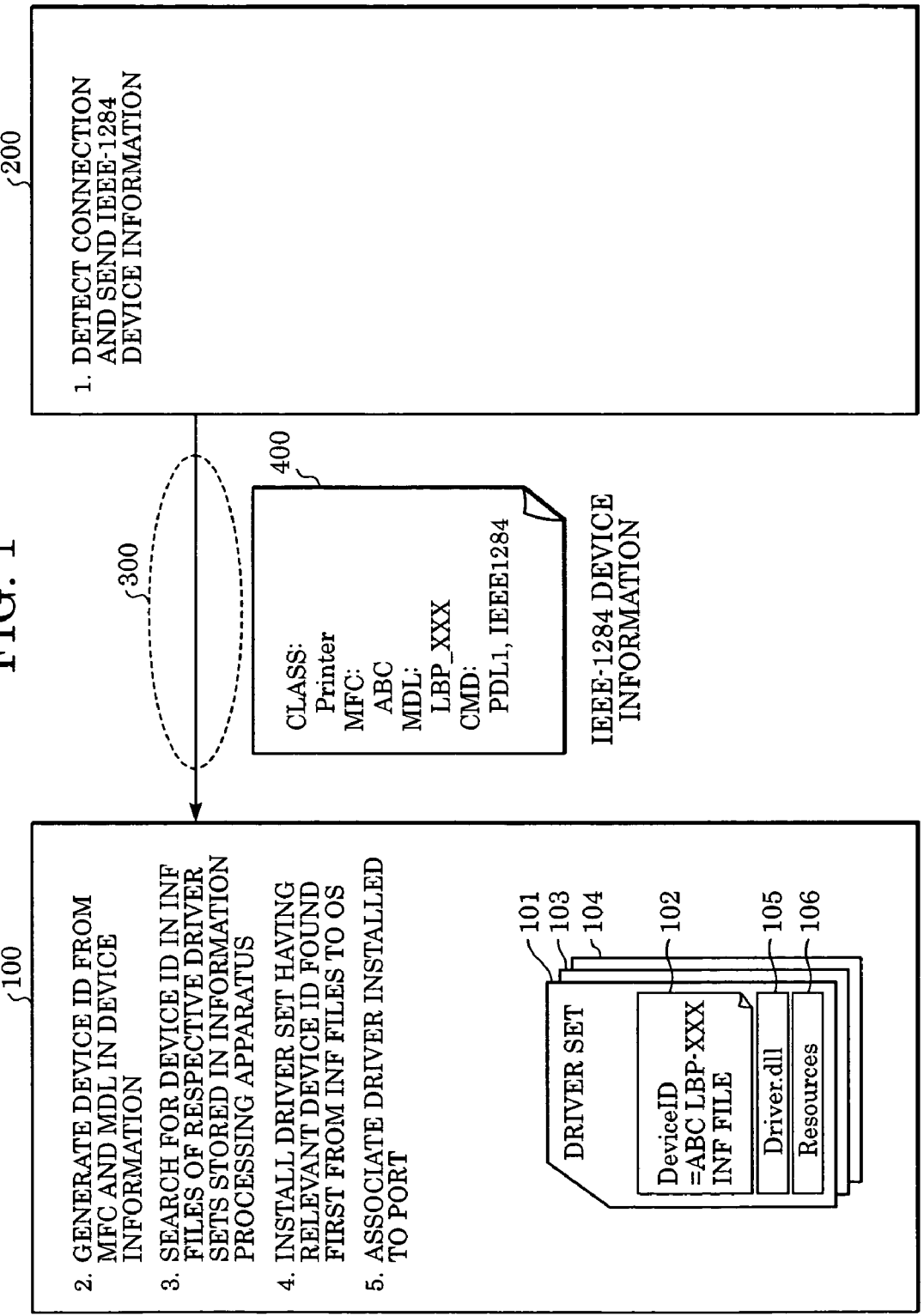
FIG. 1 is a diagram showing presuppositions of embodiments of the present invention.

A print processing apparatus, e.g., a laser beam printer, has a command interface of its own drawing language system, such as a page description language (PDL), so as not to be dependent on specific information processing apparatuses, operating systems (hereinafter abbreviated as OS) that run on information processing apparatuses, or applications that run on operating systems.

The drawing language systems depend on individual print processing apparatuses. Thus, in order to encapsulate the dependency, an OS defines a module called a printer driver, which converts input via a standard drawing interface into output of commands of a drawing language system specific to a print processing apparatus. The printer driver is usually developed by a manufacturer of the print processing apparatus or a developer of the OS, and is stored in the information processing apparatus. A variety of printer drivers is stored in an information processing apparatus. Thus, it only causes confusion to present all the printer drivers existing in the information processing apparatus. It is desired that a user is allowed to use the print processing apparatus by efficiently associating a printer driver with the print processing apparatus. Thus, a printer driver is only stored in the information processing apparatus in an initial state of the OS, and the user must install the printer driver to the OS to associate the printer driver with a specific print processing apparatus.

In order to alleviate the laboriousness of the work of installation, the function of plug and play is introduced to the OS. With plug and play, only by connecting an information processing apparatus to a print processing apparatus via a communication medium, such as a Centronics bus or a USB bus, bilateral communications are automatically carried out between the information processing apparatus and the print processing apparatus without an operation by the user, installing a driver relevant to the print processing apparatus on the information processing apparatus.

In order to meet the needs of users or the markets of various countries, drawing language systems for various print processing apparatuses have been developed and placed on the markets. It is costly to develop a print processing apparatus from scratch for each drawing language system. In order to reduce cost, in a type of print processing apparatus that has become available, factors that depend on the respective drawing language systems are separated in the form of extension boards or software, and the extension boards or software can be re-mounted on the print processing apparatus in accordance with the needs of users or the markets of various countries. In another type of print processing apparatus that has become available, in consideration of an environment where a plurality of drawing language systems desired by a user exists, a plurality of drawing language systems is supported by a single print processing apparatus.

The print processing apparatus in which the drawing language system can be modified by an extension board or software, or the print processing apparatus supporting a plurality of drawing language systems, had not been anticipated when plug and play was introduced. Furthermore, since plug and play was introduced to alleviate the laboriousness of the work of installation by a user, plug and play assumes that a user interface that requests selection unwanted by a user not familiar with print processing apparatuses, such as selection of a drawing language system, is not to be displayed.

By the two reasons described above, in a plug and play function mounted on an OS, of data for identifying a print processing apparatus, passed from the print processing apparatus to an information processing apparatus, a printer driver is searched for from the information processing apparatus based only on a manufacturer name and a name of print processing apparatus, disregarding information representing a drawing language system, and a printer driver that is found first is installed.

FIG. 1 is a diagram showing presuppositions of a plug and play function according to embodiments of the present invention.

A basic operation regarding a method of installing a printer driver by plug and play, which is presupposed in embodiments of the present invention, will be described with reference to FIG. 1. An information processing apparatus 100 is a host computer, e.g., an ordinary personal computer (PC) or a workstation. The information processing apparatus 100 stores a plurality of printer driver sets 101 that is packed together with an OS. The driver set 101 includes an INF file 102 in which unique information that is referred to when installing a driver is written, various execution modules, and resources. In the INF file 102, DeviceID that is formed using values of a manufacturer name MFC tag and a product name MDL tag included in device information that is passed when plug and play is exercised. The DeviceID is used as an identifier for correcting associating a print processing apparatus with a printer driver at the time of installation. In the INF file 102, information of a CMD tag representing a drawing language system is not written. When the information processing apparatus 100 is connected to a print processing apparatus 200 via a communication medium 300, the print processing apparatus 200 detects the connection, and sends device information 400 defined by IEEE 1284, including information specific to the print processing apparatus 200, to the information processing apparatus 100 via the communication medium 300. The IEEE-1284 device information 400 includes information shown in FIG. 16.

The OS in the information processing apparatus 100, upon receiving the device information, reads a CLASS tag to recognize that plug and play involves a print processing apparatus, and starts installation of a printer driver. The OS generates DeviceID constructed of MFC and MDL of the device information 400. The OS then searches the printer driver sets stored for a printer driver set 101 having an INF file 102 in which the DeviceID is written.

When a corresponding printer driver set 101 is found, various execution modules and resources in the driver set are installed on the OS. Then, the driver installed is associated with the port of the communication medium 300 through which the IEEE-1284 device information 400 has been received. When a corresponding driver set is absent in the information processing apparatus 100, installation is not executed and plug and play is canceled.

As described above, the DeviceID that serves as a key when searching for a driver set associated with a print processing apparatus from sets of driver sets stored in an information processing apparatus is constructed of only an MFC tag and an MDL tag of the IEEE-1284 device information 400. In plug and play that has hitherto been used, a CMD tag is not used as information for searching for a driver set. Thus, in current plug and play, even if the CMD set differs, as long as the machine type is the same, a print processing apparatus is recognized as the same print processing apparatus even when an extension board is replaced or added. A flow of installation of a printer driver by plug and play that is currently used will be described with reference to FIG. 16. The left column shows tags, and the right column shows values allowed. The value of a CLASS tag is Printer. The Class tag stores a value representing a device type. In this case, it is indicated that the peripheral device connected is a print processing apparatus. The value of an MFC tag representing a manufacturer name is ABD. That is, it is indicated in this example that the manufacturer is ABD. The value of an MDL tag is LBP-XXX. In this example, it is indicated that the type of the peripheral device is LBP-XXX. The values of a CMD tag are PDL1 and IEEE 1284. The values of the CMD tag include commands and PDL name exchanged via a communication medium. In this example, it is indicated that the peripheral device exchanges commands of a PDL type PDL1 by IEEE 1284.

Figure 14:
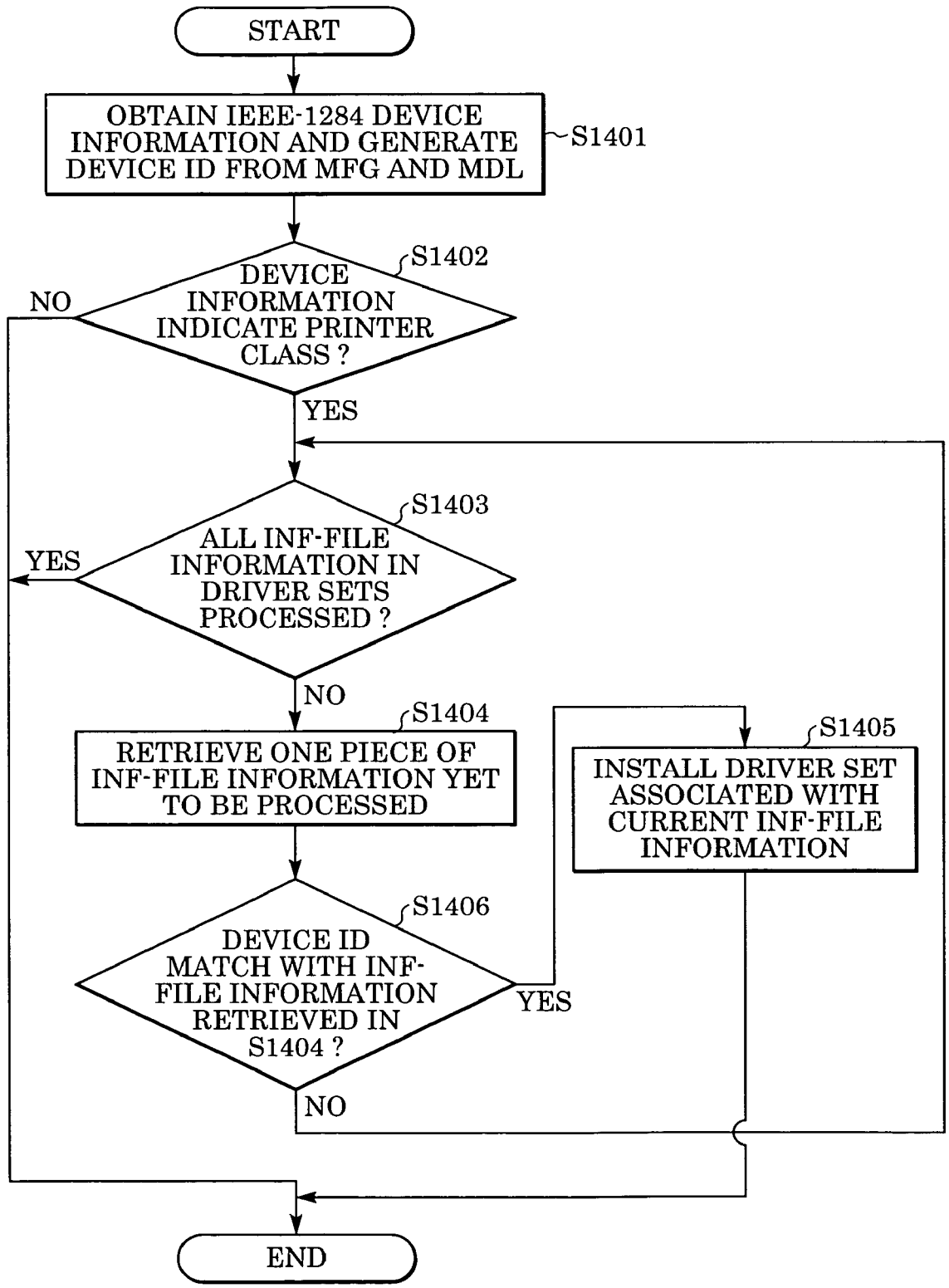
FIG. 14 is a flowchart of a process executed by a plug-and-play manager and a printer-class installer.

FIG. 14 is a diagram showing a process executed by a plug-and-play manager 104 and a printer-class installer stored in the information processing apparatus 100.

FIG. 14 is a flowchart of a process that is activated when the plug-and-play manager 104 obtains DeviceID. Step S1402 is executed by the plug-and-play manager 104, and steps S1403 to S1406 are executed by the printer-class installer 103. In step S1401, the plug-and-play manager 104 obtains IEEE-1284 device information issued by the print processing apparatus 200. The print processing apparatus 200 generates DeviceID based on the MFG tag and MDL tag. In step S1402, it is determined whether the device information indicates a printer class with reference to the CLASS tag in the IEEE-1284 device information. When a printer class is not indicated, the process is exited. When a printer class is indicated, the process proceeds to step S1403. In step S1403, it is determined whether all the INF-file information in the driver set has been processed. When all the information has not been processed, the process proceeds to step S1404. When it is determined in step S1403 that all the INF-file information has been processed, the process is exited. In step S1404, a piece of INF file information that is not yet processed is retrieved, and the process proceeds to step S1406. In step S1406, it is determined whether DeviceID in the current INF file matches DeviceID generated based on the IEEE-1284 device information issued by the print processing apparatus 200. When these DeviceIDs match, the process proceeds to step S1405. Otherwise, the process returns to step S1403.

In step S1405, a driver set associated with the current INF-file information is installed, and the driver set is associated with a port. The process is then exited. For example, a device driver name associated with a machine type and a manufacturer name is searched for and detected from a file system formed in an HDD 1003, and the entire system is configured so that the OS is allowed to recognize a directory and address of the device driver. That is, the driver is set to a registry of the OS so that the driver can be activated. This concludes the description of the presuppositions of the embodiments of the present invention.

Embodiment of Printing System

Figure 12:
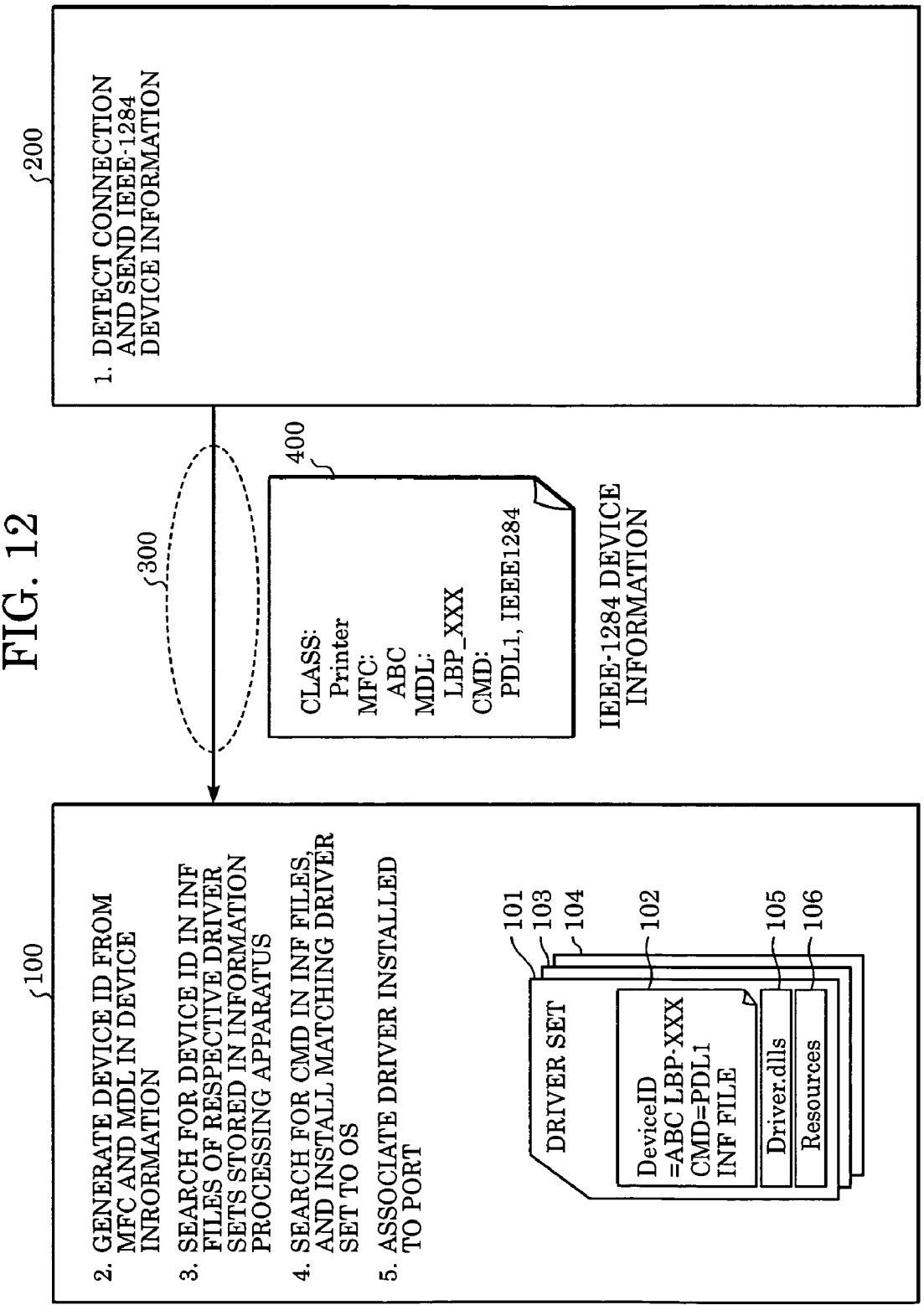
FIG. 12 is a diagram showing a printing system according to an embodiment of the present invention.

A printing system according to an embodiment of the present invention will be described with reference to FIG. 12. The information processing apparatus 100 stores sets of printer driver sets 101 packed with an OS. Each of the driver sets 101 includes an INF file 102, various execution modules, and resources. In the INF file 102, DeviceID is written. The DeviceID is formed using values of a manufacturer name MFC tag and a product name MDL tag in device information 400 that is passed when plug and play. As opposed to the example shown in FIG. 1, in the INF file 102, a CMD descriptor that is associated with a CMD tag in the device information 400 is written. The DeviceID and the CMD descriptor are used as identifiers for correcting associating a printer driver with a print processing apparatus at the time of installation.

When the information processing apparatus 100 is connected to the print processing apparatus 200 via the communication medium 300, such as a network, a Centronics bus, or an IEEE 1284.4 bus, the print processing apparatus 200 detects the connection, and sends device information 400, for example, defined by IEEE 1284, including information specific to the print processing apparatus 200, to the information processing apparatus 100 via the communication medium 300. The IEEE-1284 device information 400 includes information shown in FIG. 16. It is to be understood that the device information is not limited to IEEE-1284 device information used in this embodiment. For example, printer configuration information shown in FIG. 7 of Japanese Patent Laid-Open No. 2003-6133 may be used to implement UPnP-compliant or similar network-enabled plug and play.

The OS in the information processing apparatus 100, upon receiving the device information 400, reads the CLASS tag to recognize that plug and play involves a print processing apparatus, and starts installation of a printer driver. The OS generates DeviceID formed of MFC and MDL in the device information 400. Then, the OS searches for a printer driver set 101 having an INF file 102 in which the DeviceID is written from the printer driver sets stored.

When a corresponding printer driver set 101 is found, a CMD descriptor in the INF file associated with the printer driver set 101 is referred to. When the CMD descriptor matches, various execution modules and resources in the driver set 101 are installed to the OS. Then, the driver installed is associated with the port of the communication medium 300 through which the IEEE-1284 device information 400 has been received. When a DeviceID and a CMD descriptor of a corresponding driver set are absent in the information processing apparatus 100, the process is exited without executing installation.

Embodiment of Information Processing Apparatus

Figure 13:
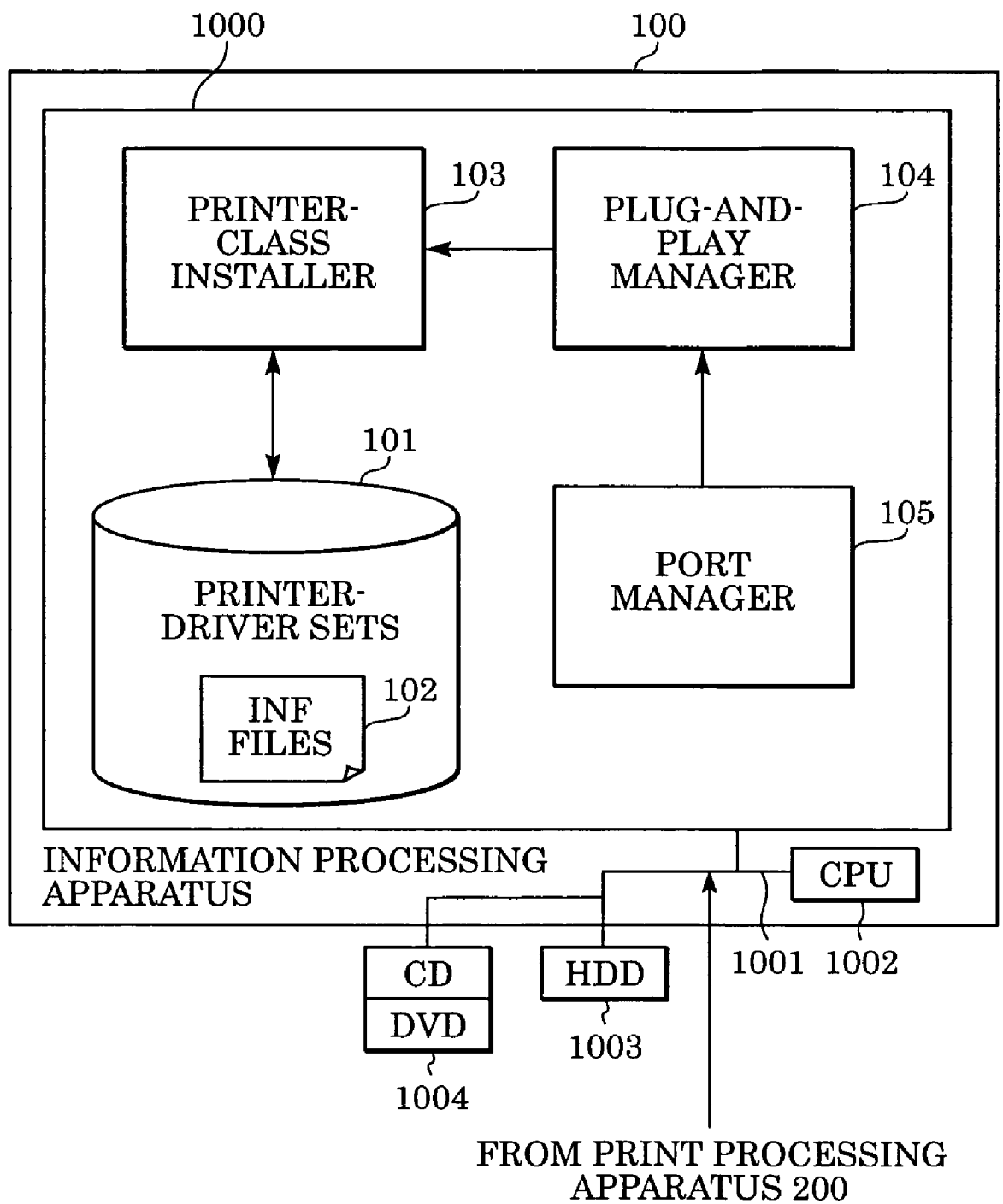
FIG. 13 is a diagram showing a set of programs relating to automatic installation of a printer driver in an information processing apparatus.

FIG. 13 is a block diagram of programs for automatic installation of a printer driver in the information processing apparatus 100.

An HDD 1003 is a hard disk having such a large capacity that allows programs to be loaded to a RAM 1000, INF files, or driver sets 101 to be stored in advance. A CD/DVD-ROM/RAM drive 1004 has the same function. Each module set includes a port manager, a plug-and-play manager, a printer-class installer, and one or more printer driver sets. The RAM 1000 reads the program modules from the HDD 1003 and executes the program modules.

A CPU 1002 controls the printer-class installer 103, the plug-and-play manager 104, and the port manager 105 integrally, and executes processes according to flowcharts in this application by reading programs, for example, from the HDD 1003 and executing the programs.

The port manager 105 controls an interface on the side of the information processing apparatus 100 connected to the communication medium 300 to allow communications with the print processing apparatus 200. When a printer driver is automatically installed, the port manager 105 receives the IEEE-1284 device information 400 and passes it to the plug-and-play manager 104. The plug-and-play manager 104 is a module that controls information exchanged with the print processing apparatus 200 to exercise plug and play. The plug-and-play manager 104 passes the device information 400 received from the port manager 105 to class installers for printers, scanners or the like. A bus 1001 connects the components with the CPU 1002. A communication medium for exchanging DeviceID is not limited to an IEEE-1284 bus. For example, a network interface that allows exchange of DeviceID may be used.

The printer-class installer 103 is a module that is in charge of installing a printer driver. The printer-class installer 103, based on the device information 400 received from the plug-and-play manager 104, searches for a printer driver set corresponding to the device information 400 from one or more printer driver sets. When a corresponding printer driver set is found, the printer-class installer 103 installs the printer driver and associates the printer driver with the port.

The printer driver set 101 includes a set of printer driver executing modules including resources and operation modules such as DLL, and an INF file for describing features thereof for installation. In the INF file, DeviceID formed of a manufacturer name MFG and a product name MDL included in device information passed from the information processing apparatus 100 when plug and play is exercised, and a CMD descriptor describing a name of a PDL that that can be issued by the printer driver and interpreted by the print processing apparatus 200 associated with the printer driver is written. In the device information passed from the information processing apparatus 100, the PDL name is written as a CMD tag.

Figure 15:
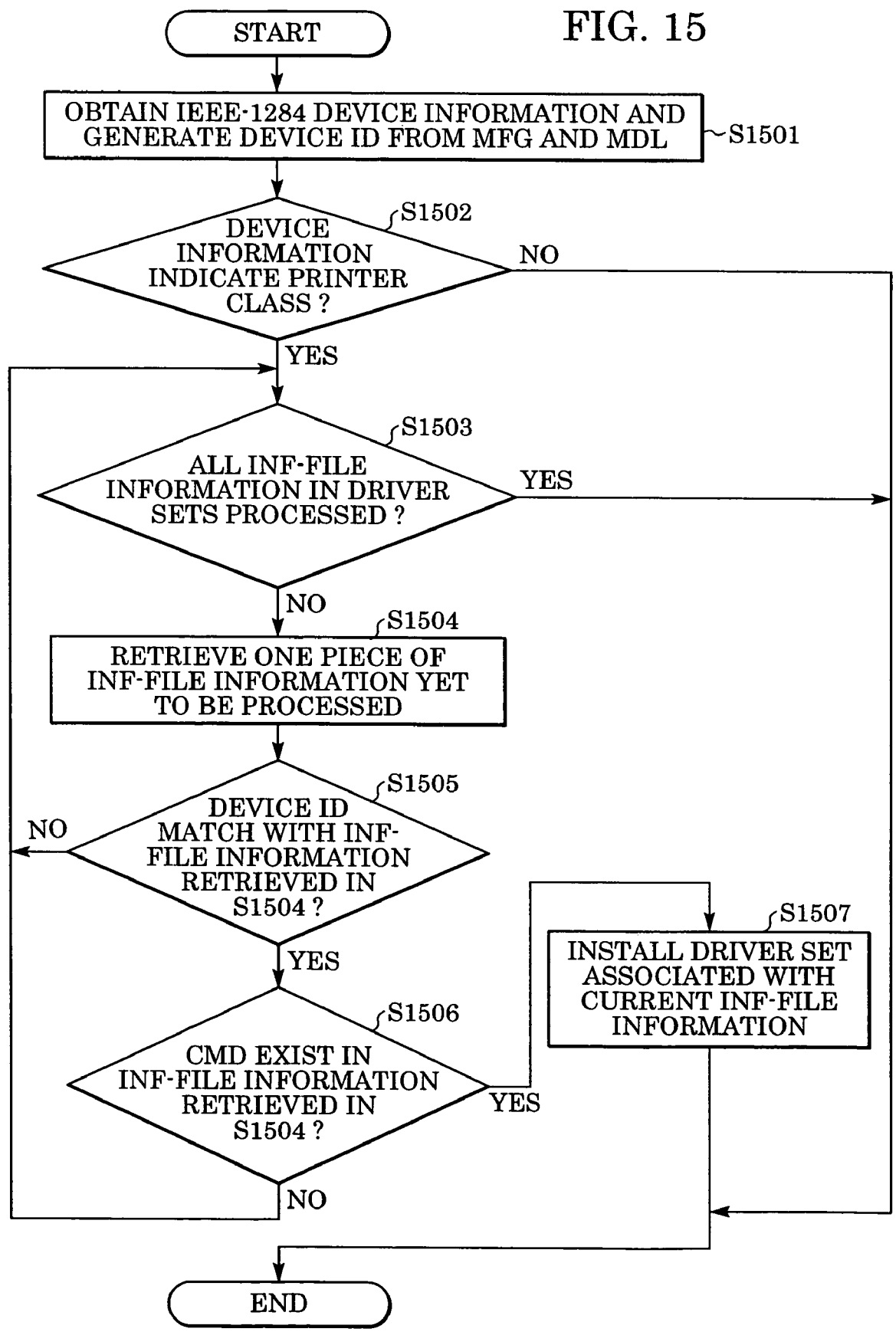
FIG. 15 is a flowchart of a process of installing a printer driver by plug and play.

A processing flow of installation of a printer driver by plug and play in this embodiment will be described with reference to FIG. 15. The process is executed by the printer-class installer 103.

In step S1501, the plug-and-play manager 104 obtains IEEE-1284 device information issued by the print processing apparatus 200, and generates DeviceID from MFG and MDL. Then, in step S1502, the plug-and-play manager 104 refers to CLASS in the IEEE-1284 device information to determine whether the device information indicates a printer class. When a printer class is not indicated, the process is exited. When a printer class is indicated, the process proceeds to step S1503.

In step S1503, the printer-class installer 103 determines whether all the INF-file information in the driver sets has been processed. When it is determined that all the INF-file information has been processed, the process is exited. When it is determined that INF-file information yet to be processed exists, the process proceeds to step S1504, in which the printer-class installer 103 retrieves a piece of INF-file information yet to be processed. Then, in step S1505, the printer-class installer 103 determines whether the description of DeviceID in the current INF retrieved in step S1504 matches the DeviceID generated based on the IEEE-1284 device information issued by the print processing apparatus 200. When these DeviceIDs match, the printer-class installer 103 proceeds to step S1506. When the DeviceIDs do not match, the printer-class installer 103 returns to step S1503 to determine whether next INF-file information yet to be processed exists. In step S1506, the printer-class installer 103 determines whether the CMD descriptor in the INF-file information retrieved in step S1504 matches the CMD in the IEEE-1284 device information 400 issued by the print processing apparatus 200.

In this embodiment, a plurality of command-set names may be written in the CMD tag of the device information 400 by separating the names by commas. When a plurality of command-set names is written, searching for a match is performed for each of the command-set names.

When the CMD descriptor in the INF-file information matches at least one of CMD items in the IEEE-1284 device information 400 issued by the print processing apparatus 200, the process proceeds to step S1507. When the CMD descriptor in the INF-file information matches none of the CMD items in the IEEE-1284 device information 400 issued by the print processing apparatus 200, the process returns to step S1503.

In step S1507, a driver set corresponding to the INF-file information is installed, and the driver set installed is associated with the port. More specifically, a file name of the printer driver, which can be uniquely identified by DeviceID (MFC and MDL) and CMD, is identified based on the INF file 102. In the example shown in FIG. 12, the name of a current driver included in the INF-file information retrieved in step S1504 is obtained in step S1507, the driver having the driver name is read from the HDD and installed so that the driver can be recognized by the OS. Usually, the INF file and Driver.dll associated with the device driver exist in the same directory. Thus, an installer or installing application of the OS is allowed to find a suitable driver immediately and to install the driver. As described above, by uniquely associating a suitable device driver with the INF-file information retrieved in step S1504, the values of CMD, MFC, and MDC are extracted from the device information 400, and are compared with the values of CMD, MFC, and MDC in the INF-file information. When these values match, a driver name associated with the INF-file information can be found. Thus, the driver is searched for from a suitable directory and is registered in a registry so that the driver can be recognized by the OS or an application, whereby installation is finished.

The flow described above is a method of installing a single printer driver on the single print processing apparatus 200 by the information processing apparatus 100. In an alternative embodiment, using a loop by causing the process to return to step S1503 after step S1507, it is possible to simultaneously install a plurality of printer drivers when a plurality of command-set names is listed by separating the names with commas in the CMD tag of the device information 400.

For example, when PDL1 and PDL2 are written in the CMD tag, it is possible to identify driver DLL files in which PDL1 and PDL2 are written as the CMD descriptor and to install the drivers one after another.

Embodiment of Print Processing Apparatus

Figure 2:
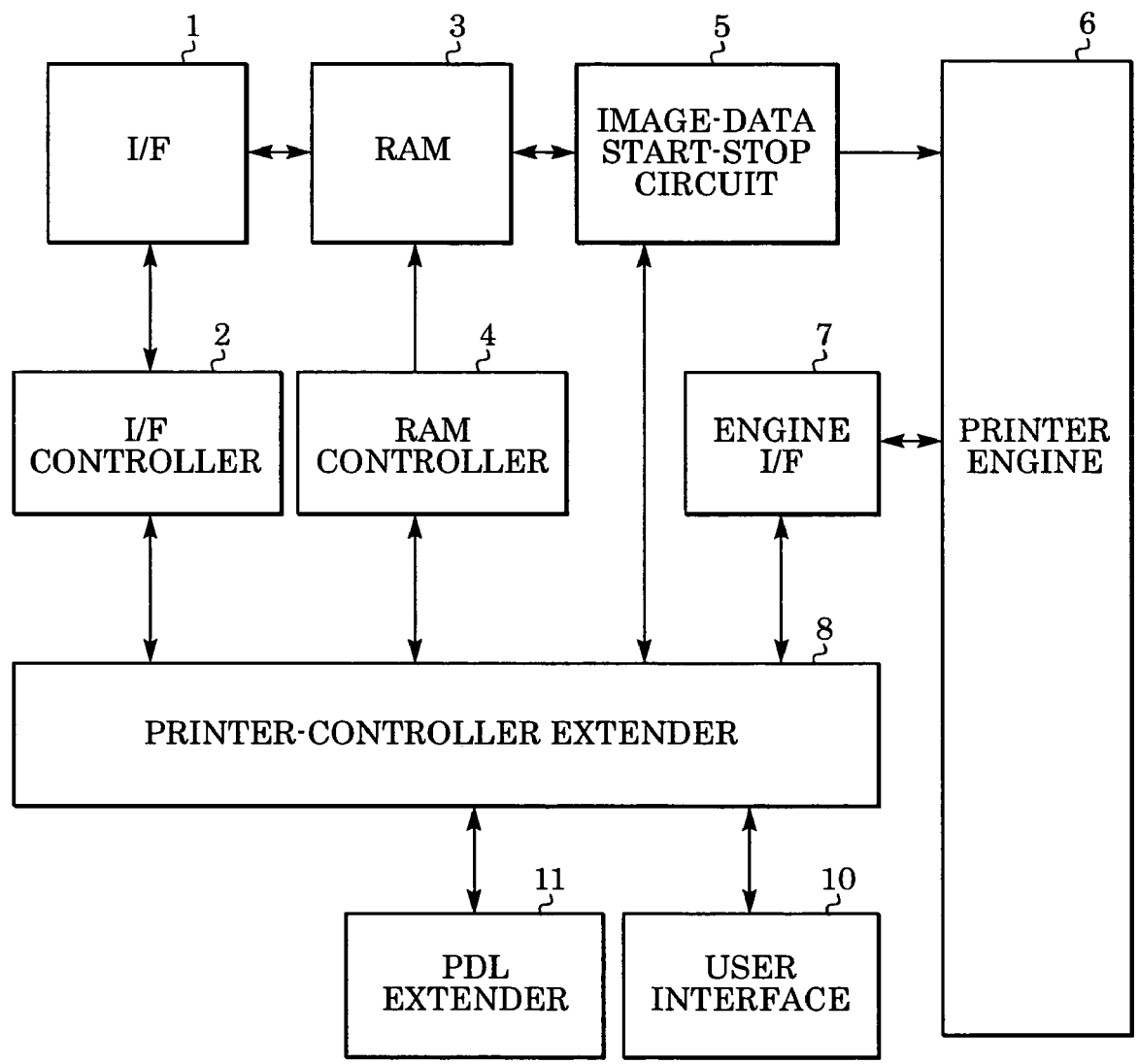
FIG. 2 is a block diagram showing the construction of a print processing apparatus according to an embodiment of the present invention.

FIGS. 2 and 3 show block diagrams of print processing apparatuses 200 according to embodiments of the present invention. FIG. 2 shows a print processing apparatus 200 in which only a single PDL extender 11 is added. FIG. 3 shows a print processing apparatus 200 in which two PDL extenders 11a and 11b or more PDL extenders are added. These print processing apparatuses 200 are constructed the same except for the PDL extender 11, and it is possible to change PDL supported by a print processing apparatus 200 by changing a PDL extender or to increase the number of PDL extenders to more than two. It is also possible to dynamically switch PDL supported or to increase the number of PDLs supported by providing a detachable connector in a printer-controller extender 8. Each of these print processing apparatuses 200 includes the following ten types of blocks.

An I/F 1 is an interface of a print processing apparatus 200, connected to the communication medium 300 shown in FIG. 1.

The I/F controller 2 is a device that controls communications carried out via the I/F 1. When the print processing apparatus 200 is connected to the information processing apparatus 100, the I/F controller 2, in response to an instruction from the printer-controller extender 8, sends suitable IEEE-1284 device information 400 to the information processing apparatus 100.

A RAM 3 is a storage area for temporarily storing information in the print processing apparatus 200. The RAM 3 stores PDL data transmitted from the information processing apparatus 100 via the I/F 1. The RAM 3 is also used to temporarily store bitmap data that can be interpreted by a printer engine 6, obtained by converting the PDL data by the PDL extender 11.

A RAM controller 4 is used to correctly convey the PDL data stored in the RAM 3 to the printer-controller extender 8. Furthermore, the RAM controller 4 exercises control to store bitmap data that can be interpreted by the printer engine 6, obtained by converting the PDL data by the PDL extender 11, in the RAM 3.

An image-data start-stop circuit 5 is a circuit for outputting the bitmap data stored in the RAM 3 in synchronization with rotation of the printer engine 6.

The printer engine 6 is a device for recording bitmap data that can be interpreted by the printer engine 6, obtained by converting the PDL data by the PDL extender 11, on a print medium, such as paper.

An engine I/F 7 is a controller that manages information for controlling the printer engine 6 according to instructions from the printer-controller extender 8. The engine I/F 7 receives requests regarding, for example, sheet feeding specified using a user interface or by PDL from the printer-controller extender 8, and requests the printer engine 6 to execute the requests.

The printer-controller extender 8 is a controller that functions like a hub between the PDL extender 11 and other devices. The printer-controller extender 8 passes to the I/F controller 2 IEEE-1284 device information that is needed for plug and play in accordance with the status of connection of the PDL extender 11. The printer-controller extender 8 passes PDL data received from the RAM controller 4 to the PDL extender 11, requesting the PDL extender 11 to convert the PDL data into bitmap data that can be interpreted by the printer engine 6. The printer-controller extender 8 passes the bitmap data received from the PDL extender 11 to the RAM controller 4, and requests the image-data start-stop circuit 5 to transfer the bitmap data from the RAM 3 to the printer engine 6 when the printer engine 6 is ready to operate. The printer-controller extender 8 conveys control information to the engine I/F 7 in response to setting of sheet feeding by a user interface or the PDL data interpreted by the PDL extender 11. The PDL extender 11 receives PDL data from the printer-controller extender 8 and converts the PDL data into bitmap data that can be interpreted by the printer engine 6, passing the bitmap data to the printer-controller 8. Furthermore, the PDL extender 11 parses setting in the PDL data, such as sheet feeding, and passes the result to the printer-controller extender 8. For example, the PDL extender 11 parses PDL2 or PDL 1. It is possible for a single PDL extender to parse two or more PDLs.

Furthermore, the IEEE-1284 device information 400 used for plug and play is stored in the PDL extender 11.

The IEEE-1284 device information 400 is obtained in response to a request from the printer-controller extender 8. A user interface 10 conveys instructions by a user to the printer-controller extender 8. The user interface 10 includes input and output devices, such as liquid crystal touch panel and numeric keys.

Figures 4A, 4B, 5:
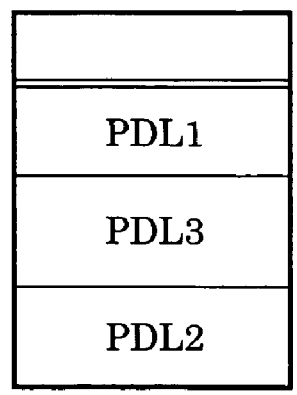
FIGS. 4A and 4B are diagrams showing examples of PDL-extender information of PDL extenders.
FIG. 5 is a diagram showing an example of PDL-priority-order information.

FIGS. 4A and 4B show examples of PDL-extender information from which the IEEE-1284 device information 400 of each PDL extender is generated. In each of the examples, the PDL-extender information includes three pieces of information. A first piece of information is IEEE-1284 device information that the print processing apparatus 200 returns via the communication medium 300. A second piece of information includes a text string PDL1 in an MDL name, and when a printer driver set 101 associated with a suitable PDL, whose INF includes description of DeviceID corresponding to the MFG and MDL, exists in the information processing apparatus 100, a suitable driver can be installed by plug and play.

A third piece of information is a value representing recommendability of the PDL extender in this embodiment for main PDLs.

In this embodiment, the recommendability is defined in a range of 0.000 to 9.999, the recommendability being higher as the value becomes greater. This is not particularly needed in other embodiments. The PDL names are the names of main PDLs supported by PDL extenders.

For example, when the PDL extender shown in FIG. 3 mainly supports PDL1, PDL-extender information 11(*a*) shown in FIG. 4A is held in the PDL extender 11*a* shown in FIG. 3. For example, the recommendability of PDL1 is 2.000, and the MDL name of the IEEE-1284 device information includes a text string PDL1. Then, in accordance with the extender information, a driver for PDL1 is prepared as a driver set to be stored in the information processing apparatus. As shown in FIG. 12, in the INF file of the driver set 101, DeviceID formed of the MFG and the MDL including the text string PDL1 is written.

When the PDL extender 11*b* shown in FIG. 3 mainly supports PDL2, PDL-extender information 11(*b*) shown in FIG. 4B is held in the PDL extender 11*b*. In this example, the recommendability of PDL2 is 1.000, and the MDL name of the IEEE-1284 device information includes a text string PDL2. A driver for PDL2 is prepared as a suitable driver set to be stored in the information processing apparatus, and DeviceID formed of the MFG and the MDL including the text string PDL2 is written in the INF file thereof.

FIG. 5 shows an example of PDL-priority-order information. FIG. 6 is a flowchart of a process of issuing device information according to PDL priority. Now, an example operation of the system will be described with reference to FIGS. 5 and 6. The printer-controller extender 8 has PDL-priority-order information regarding priority of PDLs that can be mounted on the print processing apparatus 200, shown in FIG. 5. It is to be assumed herein that higher layers of the array of PDL-priority-order information have higher priorities. Based on the PDL-priority-order information, PDL-extender information is obtained from the device information (11(*a*) and 11(*b*) shown in FIGS. 4A and 4B) of PDL extenders currently mounted, according to the flow shown in FIG. 6. That is, a PDL extender associated with a PDL having a highest priority among mainly supported PDLs is selected according to the flow shown in FIG. 6. The device information 400 shown in FIG. 12 is generated based on the IEEE-1284 device information shown in FIG. 4 of the PDL extender (11*a* or 11*b* shown in FIG. 3) and is sent to the information processing apparatus 100.

With reference to the flowchart shown in FIG. 6, a determining process executed by the print processing apparatus 200 based on PDL-priority-order information in a case where the information processing apparatus 100 is connected to the print processing apparatus 200 via the communication medium 300 or the PDL extender 11 is newly connected to the print processing apparatus 200 will be described.

In step S601, the PDL-priority information held in the printer-controller extender 8 is obtained by the RAM controller 4 or the printer-controller extender 8. The process then proceeds to step S602. Although the PDL-priority-order information is held by the printer-controller extender 8 in this embodiment, the information may be obtained from other components of the print processing apparatus 200, a server on the Internet, or the like. Furthermore, a function that allows changing the priority may be provided on the user interface 10 shown in FIG. 2. The user interface 10 refers to an operation panel of the print processing apparatus 200, described later with reference to FIG. 10.

In step S602, PDL extenders 11 that are currently connected are detected, and the number N of PDL extenders 11 currently connected and PDL-extender information held in each of the PDL extenders 11 currently connected are obtained. The process then proceeds to step S603.

In step S603, when the printer-controller extender 8 determines that the number N of PDL extenders connected is 0, it is determined that no PDL can be interpreted, so that the process proceeds to step S609. When the printer-controller 8 determines that the number N is not 0, the process proceeds to step S604. In step S604, the printer-controller extender 8 determines whether all PDL information in the PDL-priority-order information shown in FIG. 5 has been processed. When it is determined that all the PDL information has not been processed, the process proceeds to step S605, in which a PDL yet to be processed is obtained sequentially from the top of the stack shown in FIG. 6, and the type of PDL obtained is marked as processed. Then, the process proceeds to step S606. When it is determined in step S604 that all the PDL information in the PDL-priority-order information has been processed or PDL-priority-order information is absent, the process proceeds to step S609. In step S609, the process is exited without issuing IEEE-1284 printer information.

If PDL-priority-order information is not set in the print processing apparatus 200, when it is determined in step S603 that N is not 0 so that the process proceeds to step S609, instead of simply exiting the process, the print processing apparatus 200 may transfer to the information processing apparatus 100 DeviceID that causes a printer driver associated with a predetermined default PDL to be selected. For example, CMD in which PDL1 is written as a default may be sent to the information processing apparatus 100 as printer information. Alternatively, the information processing apparatus 100 may install a default printer driver, for example, a printer driver associated with PDL1, when CMD is empty.

In step S606, the printer-controller extender 8 determines whether all the PDL-extender information in the N PDL extenders, shown in FIGS. 4A and 4B, has been processed. When the printer-controller extender 8 determines in step S606 that all the information has been processed, the process proceeds to step S604, in which the process is continued for a next unprocessed PDL on the stack of PDL-priority information. When it is determined in step S606 that PDL-extender information that is yet to be processed exists, the process proceeds to step S607, in which the printer-controller extender 8 obtains unprocessed PDL-extender information shown in FIG. 4 from the PDL extender 11*a*, the PDL extender 11*b*, or the like. The process then proceeds to step S608. When the printer-controller extender 8 determines in step S608 that the PDL name in the PDL-priority information retrieved in step S605 coincides with the PDL name in the PDL extender information (FIGS. 4A and 4B) obtained from the PDL extender 11 in step S607, the process proceeds to step S610.

In step S610, the printer-controller extender 8 issues IEEE-1284 device information (printer information) in the PDL-extender information obtained from the PDL extender 11 in step S607.

Figure 7A:
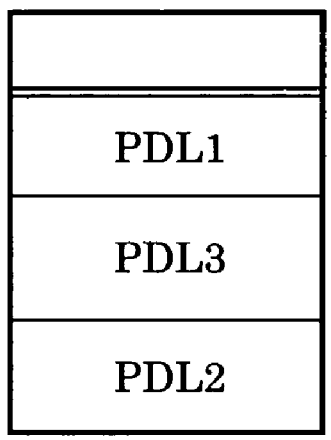
FIGS. 7A to 7C are diagrams showing examples of locale-based PDL-priority-order information.
Figure 7B:
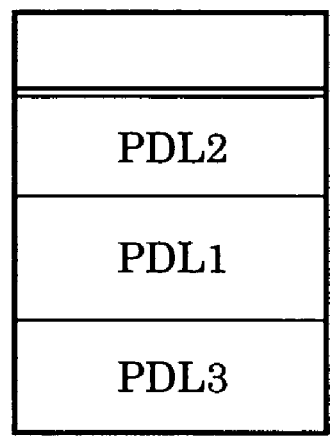
Figure 7C:
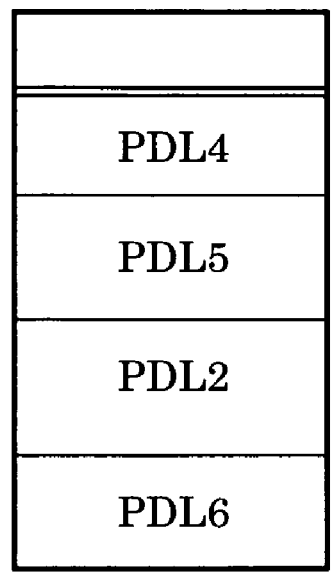
Figure 8:
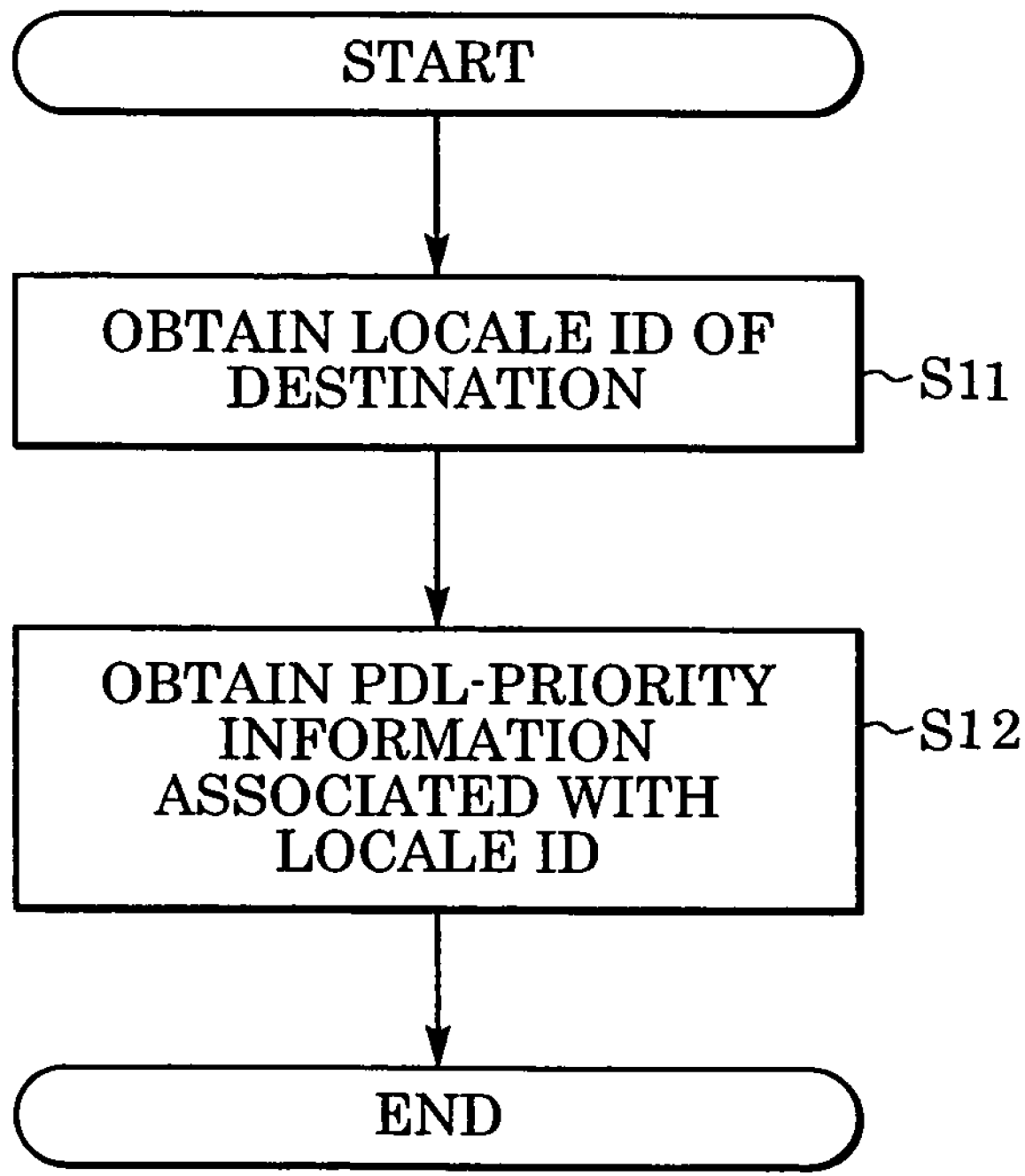
FIG. 8 is a flowchart of a process of issuing device information according to locale-based PDL priority.

FIGS. 7A to 7C are diagrams showing examples of locale-based PDL-priority-order information for the United States, Europe, and Japan, respectively. FIG. 8 is a flowchart of a process of issuing device information based on PDL priority on a locale-by-locale basis. An embodiment will be described with reference to FIGS. 7 and 8. Preference for PDLs could differ among the markets of various countries. Thus, respective pieces of PDL-priority information for various countries may be prepared so that a suitable piece of PDL-priority-order information can be selected therefrom. That is, localization for each market may be performed. In that case, the process shown in FIG. 8 is executed in the flow shown in FIG. 6.

In step S11 shown in FIG. 8, a locale ID held by the printer-controller extender 8 of a destination is obtained. Although the locale ID is held by the printer-controller extender 8 in this embodiment, the locale ID may be held by other components in the print processing apparatus 200. In step S12 shown in FIG. 8, PDL-priority-order information corresponding to the locale ID, held by the printer-controller extender 8, is obtained. Although the PDL-priority information is held by the printer-controller extender 8 in this example, the PDL-priority information may be obtained from other components in the print processing apparatus 200, a server on the Internet, or the like. Furthermore, a function of changing priority on the user interface 10 shown in FIG. 2 may be provided.

Figure 9:
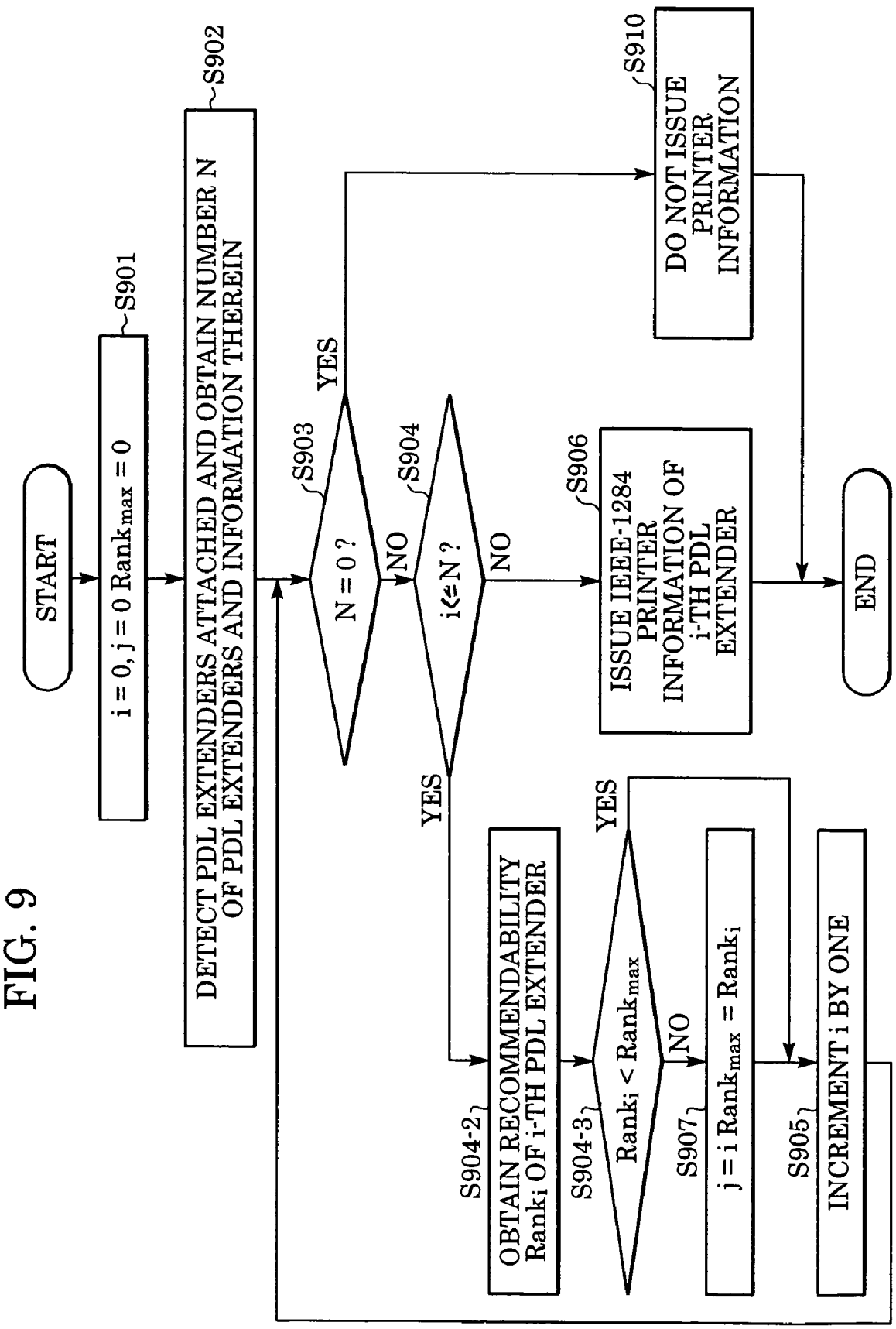
FIG. 9 is a flowchart of a process of issuing device information according to recommendability in PDL-extender information in a PDL extender.

FIG. 9 is a flowchart of a process for issuing device information based on recommendability in PDL-extender information in PDL extenders 11. A determining process based on the recommendability of PDL in the PDL-extender information in the PDL extender 11 will be described with reference to the flowchart shown in FIG. 9. In this method, the recommendability of PDL is held in the PDL extender 11, so that it is possible to deal with new PDLs not anticipated at the time of development of the print processing apparatus 200. Although the process will be described below in the context of the printer-controller extender 8, the process need not necessarily be executed by the printer-controller extender 8.

In step S901, a variable i for counting the number of PDL extenders 11 that are connected, a variable j representing the number of a PDL extender having a highest recommendability, and a variable $Rank_{max}$ representing the highest recommendability are initialized to 0.

In step S902, PDL extenders that are connected (e.g., 11*a* and 11*b*) are detected, and the number N of the PDL extenders that are connected and PDL-extender information (e.g., FIG. 4) held in the individual PDL extenders are obtained. When it is determined in step S903 that the number of PDL extenders that are connected is 0, the process proceeds to step S910. When it is determined in step S903 that the number of PDL extenders that are connected is not 0, the process proceeds to step S904. In step S904, it is determined whether i is less than or equal to N. If so, the process proceeds to step S904-2. Otherwise, the process proceeds to step S906.

In step S904-2, the recommendability $Rank_i$ of PDL held in the PDL-extender information in the i-th PDL extender is obtained, where i is an index variable. When it is determined in step S904-3 that $Rank_i$ is less than $Rank_{max}$, the process proceeds to step S905. Otherwise, the process proceeds to step S907. In step S907, i is assigned to j, holding the index of a PDL extender having a highest recommendability. Furthermore, $Rank_i$ is assigned to $Rank_{max}$ to hold the highest recommendability. Then, the process proceeds to step S905. In step S905, i is incremented by 1, and the process proceeds to step S903. In step S906, device information 400 is generated and issued based on IEEE-1284 device information in the PDL-extender information held in the j-th PDL extender 11. In step S910, the process is exited without issuing device information 400 for a printer class.

Figure 11:
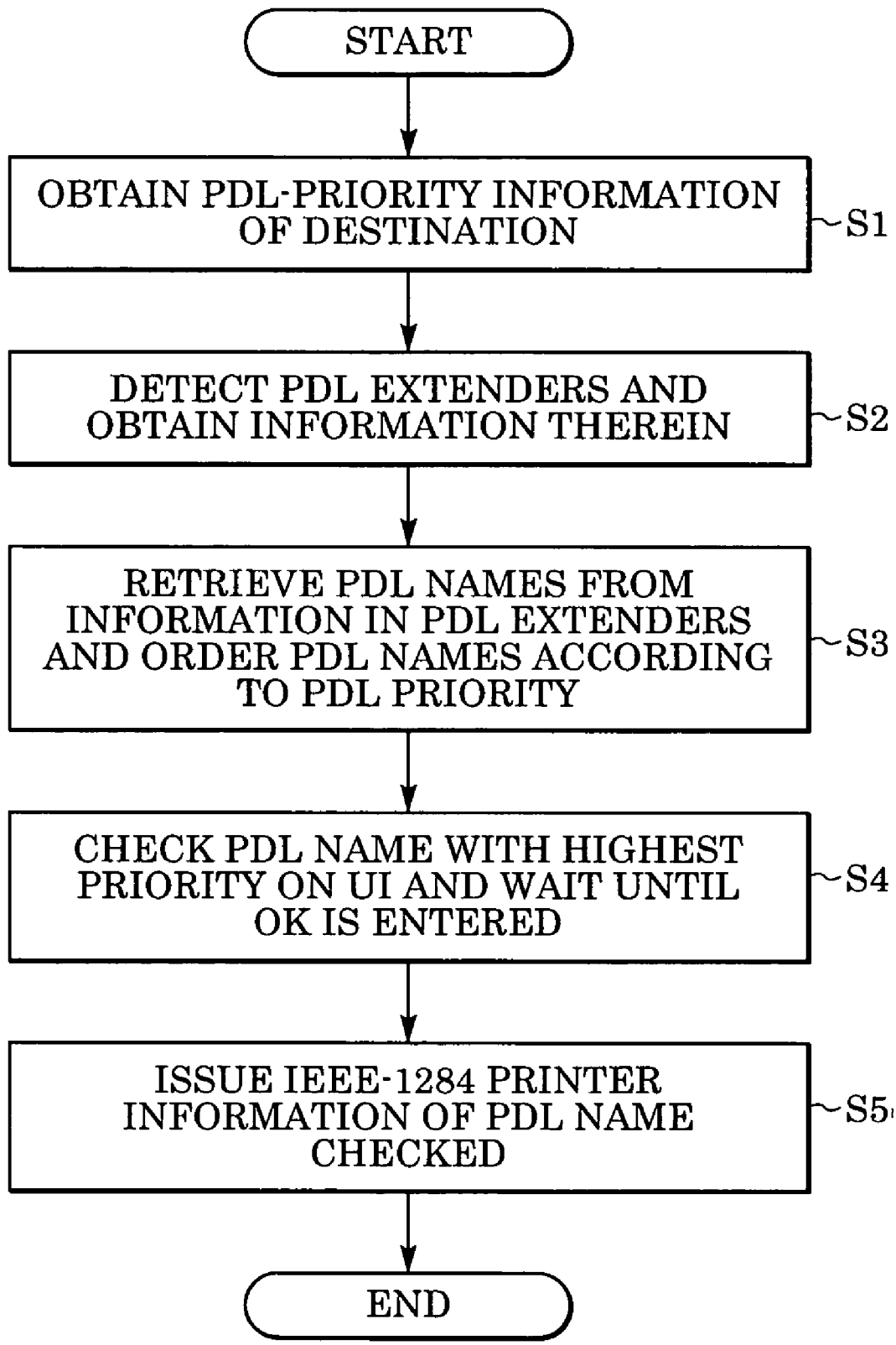
FIG. 11 is a flowchart of a process for issuing device information using a user interface.

An embodiment regarding selection of a PDL for plug and play on the user interface 10 of the print processing apparatus 200 will be described with reference to FIGS. 10 and 11. FIG. 10 is a diagram showing an example of user interface for selecting a PDL for plug and play. FIG. 11 is a flowchart of a process of issuing device information using a user interface.

FIG. 10 is a diagram showing a suitable example of user interface for selecting a PDL that is issued as device information 400. As shown in FIG. 10, PDLs supported by the print processing apparatus 200 are listed, and user interface components that allow selecting a checkbox are displayed on the right side thereof. By changing the position of the check by a user's operation on the UI, it is possible to choose a PDL that is used for plug and play. In FIG. 10, PDL1, PDL2, and PDL5 are shown in a screen for selecting a PDL for plug and play, and a checkbox on the right side of PDL5 is selected. Thus, in this example, PDL5 is selected as a PDL used for plug and play.

A flow of processing in the print processing apparatus 200 will be described with reference to FIG. 11. In step S1 shown in FIG. 11, the printer-controller extender 8 obtains a locale ID, and obtains suitable PDL-priority-order information from PDL-priority-order information for destinations, shown in FIG. 7.

In step S2 shown in FIG. 11, the PDL extender 11*a* and 11*b* (shown in FIG. 3) connected to the print processing apparatus 200 are detected, and PDL-extender information is obtained. Then, in step S3, PDL names are obtained from PDL-extender information (FIG. 4A or FIG. 4B) obtained from the PDL extender 11*a* or 11*b*, and the PDL names are ordered according to PDL-priority-order information. In step S4 shown in FIG. 11, by default, a PDL name having a highest priority according to the PDL priority information is checked on the UI and it waits until OK or Cancel is selected. In step S4 shown in FIG. 11, a user simply presses OK when the default PDL (PDL5 in FIG. 10) is to be used. When the user wishes to change the printer driver that is to be installed by plug and play, the user selects another checkbox for a PDL. In the example shown in FIG. 10, it is allowed to check a plurality of PDLs. When OK is selected in step S4, the process proceeds to step S5, in which PDL-extender information is obtained from the PDL extenders having the PDL names checked in step S4, and IEEE-1284 device information is obtained and issued as device information 400. For example, when PDL1 and PDL5 are selected, device information (printer information) including the manufacturer name and product name (machine type) of the print processing apparatus 200 and including PDL1 and PDL5 in the CMD descriptor is sent to the information processing apparatus 100. The information processing apparatus 100, in response to the device information 400, the process shown in FIG. 15 is activated. By invoking the process a plurality of times corresponding to the number of PDLs written in the CMD descriptor, it is possible to install a plurality of printer drivers.

In step S4, when the printer-controller extender 8 detects that the user has selected Cancel on the operation panel shown in FIG. 4, if device information 400 has not been issued yet, IEEE-1284 device information is obtained from the PDL-extender information of the PDL extender 11 associated with the PDL name checked in step S4, which is issued as device information 400. When device information has already been issued, device information is not issued in step S4.

Although priority in PDL-priority information is used to list PDL names in step S4 in the example described above, the listing may be based on recommendability in the PDL-extender information of the PDL extender 11.

Furthermore, although setting is performed on the user interface 10 of the print processing apparatus 200 in the embodiment described above, a UI for selecting a PDL, such as the one shown in FIG. 10, may be provided in an application that runs on an external information processing apparatus.

According to the embodiment described above, when plug and play is exercised, mismatch between a PDL issued by a printer driver and a PDL that can be interpreted by a print processing apparatus does not occur regarding a print processing apparatus to which PDL extenders can be attached and detached, so that a suitable printer driver can be installed. In a print processing apparatus supporting a plurality of PDLs, a printer driver associated with a PDL recommended by the manufacturer of the print processing apparatus or a PDL selected by a user is installed.

As described above, in an image forming system in which an image forming apparatus, e.g., the print processing apparatus 200, that is capable of dealing with a plurality of types of process and an information processing apparatus, e.g., a personal computer, that drives the print processing apparatus 200 using a printer driver, e.g., a device driver, are connected to each other via a predetermined communication medium, e.g., an IEEE-1284 bus, the print processing apparatus 200 includes the I/F controller 2. The I/F controller 2 controls a process of reading IEEE-1284 device information 400 from an extender of the print processing apparatus 200 and transfers the IEEE-1284 device information to the communication medium 300. The IEEE-1284 device information 400 includes a machine identifier, e.g., MDL, and/or a manufacturer identifier, e.g., MFC, and process identification information, e.g., CMD, identifying at least one of an image interpreting process involving PDL1 and an image interpreting process involving PDL2.

The information processing apparatus includes an obtaining unit, e.g., the port manager 105, that obtains the device information 400 transferred under the control of a transfer controlling unit, e.g., the I/F controller 2, from the communication medium, and a selecting unit, e.g., the printer-class installer 103, that selects a device driver that is capable of controlling at least one PDL process among the plurality of PDL processes supported by the print processing apparatus 200, using the machine type and manufacturer name, e.g., MFC and MDC, and the process identification information, e.g., CMD.

Furthermore, in an image forming apparatus, e.g., the print processing apparatus 200, that is capable of interpreting a plurality of image forming processes, a setting unit, e.g., the user interface 10 including the operation panel 10 shown in FIG. 10, for setting an image forming process that is to be activated by the image forming apparatus, and an issuing unit, e.g., the printer-controller extender 8, for issuing printer information 400 including a manufacturer identifier and a machine-type identifier (e.g., MFC or MDC) and including CMD, e.g., PDL5, as the image forming process set on the operation panel are provided.

The plurality of image forming processes, e.g., processes of interpreting PDL1, PDL2, and so forth, may be executed by extenders for the plurality of image forming processes, connected to or included in the image forming apparatus, e.g., the PDL extender 11a. The value of CMD may be obtained by a printer controller of the print processing apparatus 200, for example, from the PDL extender 11a.

A PDL extender may store priority information, and a printer-controller extender of the image forming apparatus may include a determining unit for obtaining priority information and determining process identification information that is issued by the issuing unit to the communication medium.

The plurality of PDL interpreting processes may have respective priorities assigned thereto, and the printer-controller extender may issue suitable process identification information by comparing the priorities with priority-order information stored in the image forming apparatus.

Furthermore, the print processing apparatus 200 may store a plurality of pieces of priority-order information (shown in FIGS. 7A to 7C) in a RAM, an HDD (not shown), or PDL extenders, selecting one of the pieces of priority-order information according to localization.

Other Embodiments

For example, when two or more PDL extenders 11 can be connected as shown in FIG. 3, priorities may be assigned to slots for connecting the PDL extenders 11 so that device information needed for plug and play can be changed. For example, referring to FIG. 3, a slot to which the PDL extender 11a is connected has a higher priority than a slot to which the PDL extender 11b is connected.

Alternatively, priorities may be assigned in order of connecting the PDL extenders 11 so that device information needed for plug and play can be changed according to the priorities. For example, when an extender connected later has priority, referring to FIG. 3, the PDL extender 11b has a higher priority than the PDL extender 11a.

Alternatively, a switch for assigning priorities to PDL extenders 11 may be provided so that device information needed for plug and play can be changed according to the priorities.

Alternatively, a switch, such as a dial, that allows specifying values of priorities to slots for connecting PDL extenders 11 may be provided so that device information needed for plug and play can be changed according to the priorities.

The present invention may be applied to a system including a plurality of apparatuses (e.g., host computers, an interface device, a reader, a printer, and the like), or to a single apparatus (e.g., a copying machine, a printer, a facsimile machine, or the like).

Furthermore, PDL extenders that can be connected to the print processing apparatus 200 may have priorities of the set of device information for plug and play regarding drawing systems.

Alternatively, priorities may be assigned to slots of the information processing apparatus for connecting PDL extenders so that the device information for plug and play can be changed. Furthermore, priorities may be assigned in order of connecting PDL extenders so that the device information for plug and play can be changed according to the priorities.

Alternatively, priorities may be assigned in order of connecting PDL extenders so that the device information for plug and play can be changed according to the priorities.

Alternatively, a switch for assigning priorities to PDL extenders may be provided so that the device information can be changed according to the priorities. Alternatively, a switch for assigning priorities to slots for connecting PDL extenders may be provided so that the device information can be changed according to the priorities.

Similar advantages can be achieved by providing a system or apparatus with a storage medium storing program code for executing the processes according to the flowcharts of the embodiments so that a computer (CPU, MPU, or the like) of the system or apparatus is allowed to read and execute the program code stored in the storage medium.

In that case, the functions of the embodiments are achieved by the program code read from the storage medium, so that the storage medium storing the program code falls within the scope of the present invention.

The storage medium for supplying the program code may be, for example, a floppy disk, a hard disk, an optical disk, a magneto-optical disk, a CD-ROM, a CD-R, a magnetic tape, a non-volatile memory card, or a ROM.

As well as achieving the functions of embodiments by a computer reading and executing the program code, an operating system (OS) or the like running on the computer may execute actual processing in part or in entirety to achieve the functions of the embodiments. This also falls within the scope of the present invention.

Also, the program code read from the storage medium may be written to a memory of a function extension board placed in a computer or a function extension unit connected to the computer so that a CPU or the like of the function extension board or the function extension unit executes actual processing in part or in entirety to achieve the functions of the embodiments. This also falls within the scope of the present invention.

In the case of a print processing apparatus in which a PDL extender is separated and supported drawing system can be changed by mounting a corresponding extension board, although it is possible to support two drawing language systems PDL1 and PDL2, let it be assumed that only PDL1 is actually supported by the print processing system. In such as a system, assuming that respective printer drivers for PDL1 and PDL2 are stored in an information processing apparatus, according to an aspect of the embodiments, installation of an unsuitable driver by plug and play can be prevented, which could otherwise occur by searching for a printer driver associated with a print processing apparatus from an information processing apparatus based only on a manufacturer name and a name of the print processing apparatus, disregarding information representing a drawing language system, among data for identifying the print processing apparatus, passed from print processing apparatus to the information processing apparatus.

When the printer driver for PDL2 is found first by plug and play, instead of installing the printer driver for PDL2 on an OS, a suitable driver for the PDL extender for PDL1, even if found later, can be installed for the print processing apparatus. Furthermore, in the case of a print processing apparatus that can support a plurality of drawing systems, the problem that a printer driver for a drawing system for emulation, not recommended by the developer, is found first and plug and play, inhibiting use of more efficient drawing system, is overcome.

Other Embodiments

The print processing apparatus 200 may have priorities for slots thereof for connecting PDL extenders so that the device information for plug and play can be changed. Alternatively, priorities may be assigned in order of connecting PDL extenders so that the device information for plug and play can be changed according to the priorities. Alternatively, a switch for assigning priorities to PDL extenders may be provided so that the device information can be changed according to the priorities. Alternatively, a switch for assigning priorities to slots for connecting PDL extenders may be provided so that the device information can be changed according to the priorities.

The processes shown in FIGS. 6, 8, 9, 11, 14, and 15 can be executed by a print processing apparatus and an information processing apparatus according to programs installed from outside sources. Information including programs may be supplied to a host computer using a storage medium such as a CD-ROM, a flash memory, or a floppy disk, or from an external storage medium via a network.

As described above, similar advantages can be achieved by providing a system or apparatus with a storage medium storing program code of software implementing the functions of the embodiments, or by downloading the program code from an external server (not shown), so that a computer (CPU, MPU, or the like) of the system or apparatus is allowed to read and execute the program code stored in the storage medium.

In that case, the novel functions of the embodiments are achieved by the program code read from the storage medium, so that the storage medium storing the program code falls within the scope of the present invention. The storage medium for supplying the program code may be, for example, a floppy disk, a hard disk, an optical disk, a magneto-optical disk, a DVD, a CD-ROM, a magnetic tape, a non-volatile memory card, a ROM, or an EEPROM.

As well as achieving the functions of embodiments by a computer reading and executing the program code, an operating system (OS) or the like running on the computer may execute actual processing in part or in entirety to achieve the functions of the embodiments. This also falls within the scope of the present invention. Also, the program code read from the storage medium may be written to a memory of a function extension board placed in a computer or a function extension unit connected to the computer so that a CPU or the like of the function extension board or the function extension unit executes actual processing in part or in entirety to achieve the functions of the embodiments. This also falls within the scope of the present invention.

According to an aspect of the present invention, even when a plurality of image forming apparatuses can be executed by an image forming apparatus, a suitable device driver can be selected and installed on an information processing apparatus.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-067443 filed Mar. 10, 2004, which is hereby incorporated by reference herein.

What is claimed is:

1. An image forming system comprising:
an image forming apparatus and an information processing apparatus that drives the image forming apparatus using a device driver, the information processing apparatus being connected to the image forming apparatus via a predetermined communication medium;
wherein the image forming apparatus comprises:
an obtaining unit configured to obtain priority-order information corresponding to a local ID of the image forming apparatus from a plurality of pieces of priority-order information, which is defined for each locale, and stored by a storage unit;
a selecting unit configured to select a highest priority PDL from a plurality of PDL supported by the image forming apparatus based on the priority-order information obtained by the obtaining unit; and
a sending unit configured to send a manufacturer identifier, a machine-type identifier, and PDL identification information which indicates the PDL selected by the selecting unit to the information processing apparatus; and
wherein the information processing apparatus comprises:
a receiving unit configured to receive the manufacturer identifier, the machine-type identifier, and the PDL identification information sent by the sending unit; and
an identifying unit configured to identify the device driver using the manufacturer identifier, machine-type identifier, and the PDL identification information received by the receiving unit.

2. An image forming method for forming an image with an image forming system having an image forming apparatus and an information processing apparatus that drives the image forming apparatus using a device driver, the information processing apparatus being connected to the image forming apparatus via a predetermined communication medium, the method comprising:
obtaining priority-order information corresponding to a local ID of the image forming apparatus from a plurality of pieces of priority-order information, which is defined for each locale, and stored by a storage unit;
selecting a highest priority PDL from a plurality of PDL supported by the image forming apparatus based on the priority-order information;
sending a manufacturer identifier, a machine-type identifier, and PDL identification information which indicates the PDL selected from the image forming apparatus to the information processing apparatus;
receiving in the information processing apparatus the manufacturer identifier, the machine-type identifier, and the PDL identification information sent by the image forming apparatus; and
identifying the device driver using the manufacturer identifier, the machine-type identifier, and the PDL identification information received by the information processing apparatus from the image forming apparatus.

3. An image forming apparatus which is capable of communicating with an information processing apparatus, the image forming apparatus comprising:

an obtaining unit configured to obtain priority-order information corresponding to a local ID of the image forming apparatus from a plurality of pieces of priority-order information, which is defined for each locale, and stored by a storage unit;
a selecting unit configured to select a highest priority PDL from a plurality of PDL supported by the image forming apparatus based on the priority-order information obtained by the obtaining unit; and
a sending unit configured to send a manufacturer identifier, a machine-type identifier, and PDL identification information which indicates the PDL selected by the selecting unit to the information processing apparatus.

4. The image forming apparatus according to claim 3,
wherein the PDL is interpreted by one of a plurality of extenders for a plurality of image forming processes, the extenders being connected to or built into the image forming apparatus.

5. An image forming method for forming an image with an image forming apparatus that is capable of communicating with an information processing apparatus, the method comprising:
obtaining priority-order information corresponding to a local ID of the image forming apparatus from a plurality of pieces of priority-order information, which is defined for each locale, and stored by a storage unit;
selecting a highest priority PDL from a plurality of PDL supported by the image forming apparatus based on the priority-order information obtained by the obtaining unit; and
sending a manufacturer identifier, a machine-type identifier, and PDL identification information which indicates the PDL selected to the information processing apparatus.

6. The image forming method according to claim 5,
wherein the PDL is interpreted by one of a plurality of extenders for a plurality of image forming processes, the extenders being connected to or built into the image forming apparatus.

7. A computer readable storage medium containing computer-executable instructions for forming an image with an image forming apparatus that is capable of communicating with an information processing apparatus, the storage medium comprising:
computer-executable instructions for obtaining priority-order information corresponding to a local ID of the image forming apparatus from a plurality of pieces of priority-order information, which is defined for each locale, and stored by a storage unit;
computer-executable instructions for selecting a highest priority PDL from a plurality of PDL supported by the image forming apparatus based on the priority-order information obtained by the obtaining unit; and
computer-executable instructions for sending a manufacturer identifier, a machine-type identifier, and PDL identification information which indicates the PDL selected to the information processing apparatus.

* * * * *